United States Patent [19]

Nakagawa

[11] Patent Number: 4,761,759
[45] Date of Patent: Aug. 2, 1988

[54] ABSOLUTE VALUE COMPARATOR FOR DIFFERENCES

[75] Inventor: Shinichi Nakagawa, Itami, Japan

[73] Assignee: Mitsubishi Denki Kabushiki Kaisha, Tokyo, Japan

[21] Appl. No.: 840,998

[22] Filed: Mar. 17, 1986

[30] Foreign Application Priority Data

Mar. 20, 1985 [JP] Japan .................................. 60-56410

[51] Int. Cl.$^4$ .......................... G06F 15/66; G06F 7/50
[52] U.S. Cl. .................................................. 364/769
[58] Field of Search ............... 364/715, 768, 769, 752; 340/146.2

[56] References Cited

U.S. PATENT DOCUMENTS

| | | | |
|---|---|---|---|
| 2,907,877 | 10/1959 | Johnson | 364/769 |
| 3,751,651 | 8/1973 | Pomella et al. | 318/521 |
| 4,290,111 | 9/1981 | Dillon | 364/768 |
| 4,648,059 | 3/1987 | Gregorcyk | 364/769 |

FOREIGN PATENT DOCUMENTS

| 2334744 | 1/1974 | Fed. Rep. of Germany . | |
| 156139 | 8/1985 | Japan | 364/768 |

*Primary Examiner*—Gary V. Harkcom
*Assistant Examiner*—Tan V. Mai

*Attorney, Agent, or Firm*—Lowe, Price, LeBlanc, Becker & Shur

[57] ABSTRACT

An absolute value comparator for differences comprising a first subtracter (1a) and a second subtracter (1b) each of which performs subtraction of n-bit digital values, a controller (8) for receiving most significant bit (MSB) carry output (g) from the first subtracter (1a) and MSB carry output (h) from the second subtracter (1b) to decide coincidence/incoincidence of the said signs as well as the sign of the output (f) from the second subtracter (1b), a first selecter (10a) for selectively passing either the output (e) from the first subtracter (1a) or a digital value obtained by inverting all bits of the output (e) responsive to a sign coincidence/incoincidence detecting signal (t) from the controller (8), a full adder (7) for receiving the sign coincidence/incoincidence detecting signal (u) from the controller (8) in its carry input terminal for the LSB stage to perform addition of output (q) from the least significant bit first selecter (10a) and the output (f) from the second subtracter (1b) to output a signal (r) indicating the sign of the result of calculation and a second selecter (10b) for selectively passing either the output (r) from the full adder (7) or an inverted signal thereof responsive to the sign detecting signal (v) from the controller (18) for the output (f) from the second subtracter (1b).

7 Claims, 3 Drawing Sheets

ABSOLUTE VALUE COMPARATOR FOR DIFFERENCES

BACKGROUND OF THE INVENTION

1. Field of the Invention

The present invention relates to a comparator for comparing absolute values of differences, and more particularly, it relates to a comparator which compares absolute values of differences between digital values.

2. Description of the Prior Art

Recentry digital signals have been employed in place of analogue signals in the field of image processing. For example, in a method for effecting contour correction, luminance signals sampled at a predetermined sampling frequency are sequentially detected from composite video signals and, then the direction in which deviation in the sampled luminance signals is larger is decided using four sampled luminance signals positioned symmetrically around a reference luminance signal. Then, contour detection is effected along the direction in which the signal deviation is larger. In this method for contour correction, a circuit for comparing absolute values of differences between sampled digital values is indispensable.

FIG. 1 is a block diagram showing an exemplary construction of a conventional circuit for comparing absolute values of differences.

With reference to FIG. 1, description is now made on the construction of the conventional circuit for comparing absolute values of differences.

The conventional circuit for comparing absolute values of differences as shown in FIG. 1 includes a first absolute value providing path and a second absolute value providing path.

The first absolute value providing path comprises:

a first subtracter 1a which receives n-bit digital values a and b and obtains the difference therebetween to supply the same to one input terminal of a multiplexer 4a and to a first inverter 2a while supplying a carry g from the most significant bit (MSB) stage of the n-bit digital value indicating the result of subtraction to the control input terminal of the multiplexer 4a, the first inverter 2a which receives n-bit output e from the first subtracter 1a and inverts all bits thereof to supply the same to a first incrementer 3a, the first incrementer 3a which receives the signal from the first inverter 2a and adds "1" thereto to supply the same to the other input terminal of the multiplexer 4a, and the first n-bit multiplexer 4a which receives the signal e from the first subtracter 1a and the signal −e from the first incrementer 3a and selectively passes either the former or the latter, in response to the MSB carry output g from the first subtracter 1a, to supply the same to one input terminal of a comparator 5.

The second absolute value providing path comprises:

a second subtracter 1b which receives n-bit digital values c and d and obtains the difference therebetween to supply the same to one input terminal of a second multiplexer 4b and to a second inverter 2b while supplying a carry h from the MSB stage of the result of subtraction to a control terminal of the second multiplexer 4b, the second inverter 2b which receives the n-bit digital signal f and inverts all bits thereof to supply the same to a second incrementer 3b, a second incrementer 3b which receives the digital signal from the second inverter 2b and adds "1" thereto to supply the same to the other input terminal of the second multiplexer 4b, and the second multiplexer 4b which receives the digital signals from the second subtracter 1b and the second incrementer 3b and selectively passes either the former or the latter, in response to the MSB carry output g from the second subtracter 1b, to supply the same to the other input terminal of the comparator 5.

The comparator 5 compares digital signals k and l from the first and second multiplexers 4a and 4b to output a digital signal m corresponding to the result of comparison.

Description is now made on the operation of the conventional circuit as shown in FIG. 1.

The first subtracter 1a receives the n-bit binary-coded digital values a and b and performs subtraction of (a−b) to output the result e of subtraction, while supplying the carry output g from the MSB stage of the result e of subtraction to the control terminal of the first multiplexer 4a. The first inverter 2a receives the result e of subtraction from the first subtracter 1a to supply the signal obtained by inverting all bits thereof to the first incrementer 3a. The first incrementer 3a adds "1" to the digital value from the first inverter 2a to supply the same to the other input terminal of the first multiplexer 4a.

Namely, one input terminal of the multiplexer 4a directly receives the result e of subtraction while the other input terminal thereof receives the digital value obtained by inverting the sign of the result e of subtraction.

With the MSB carry output g from the first subtracter 1a serving as the sign bit, (n+1)-bit digital data formed of (g+e) represents the result of subtraction (a−b) in an offset binary-coded digital value.

The MSB carry output g is "1" when the result e of subtraction (i.e., a−b) in the subtracter 1a is positive and is "0" when the result e of subtraction is negative.

When the MSB carry output g from the first subtracter 1a is "1", the first multiplexer 4a receiving the MSB carry output g in its control input terminal selects the result e of subtraction since (a−b)>0, to supply the same to one input terminal of the comparator 5. When, to the contrary, the MSB carry output g from the first subtracter 1a is "0", it indicates (a−b)<0 and hence the first multiplexer 4a selects the sign-inverted value (b−a) from the first incrementer 3a to supply the same to one input terminal of the comparator 5. Thus, the first multiplexer 4a always supplies the absolute value data k of (a−b) to one input terminal of the comparator 5.

The operation of the second absolute value providing path is identical to that of the first absolute value providing path. Namely, in response to the carry output h from the MSB stage of the result f of subtraction of the n-bit binary-coded digital values c and d, the second multiplexer 4b outputs (c−d) when the carry output h is "1" and outputs (−c+d) when the carry output h is "0". Thus, the second multiplexer 4b always supplies the absolute value data l of (c−d) to the other input terminal of the comparator 5.

The comparator 5 compares the absolute value data k from the first multiplexer 4a with the absolute value data l from the second multiplexer 4b, to output the result m of comparison.

FIG. 2 illustrates an exemplary construction of the comparator 5 used in FIG. 1.

Referring to FIG. 2, the comparator is formed by a number n of cascade-connected full adders 6 each having only a carry output and no sum output. Each full adder 6 receives a bit value $x_i$ (i=1 to n) in one input terminal thereof while receiving a bit value $y_i$ (i=1 to n) through an inverter 2. The full adder 6 for the least significant bit (LBS) is supplied with "1" in its carry input terminal, while carry output p from the full adder 6 for the most significant bit (MSB) serves as the output m of the comparator 5. The operation of the comparator is now described with reference to FIG. 2. It is assumed here that $X=\{x_i\}$ and $Y=\{y_i\}$ for convenience of illustration.

The binary digital values $X_i$ are supplied to the respective one input terminals of the full adders 6. The binary digital values $y_i$ are supplied to the respective other input terminals of the full adders 6 through the inverters 2, while the full adder 6 for the LSB is supplied with "1" in its carry input terminal. Thus, the n full adders 6 calculate (X−Y), and the full adder 6 for the MSB supplies the carry output p thereof.

If carry p=1, then X≧Y; and
if carry p=0, then X<Y.

Thus, when the carry output p is employed as the result m of comparison in the comparator 5, supplied is the binary digital value according to the values of |a−b| and |c−d|.

The conventional circuit for comparing absolute values of differences is in the aforementioned construction, whereby a large number of components such as multiplexers, incrementers and the like are required, leading to disadvantages such as increase in scale of the circuit.

SUMMARY OF THE INVENTION

An object of the present invention is to overcome the aforementioned disadvantages and provide a circuit for comparing absolute values of differences which can achieve a function similar to that of the conventional circuit, implemented in a reduced circuit scale.

Briefly stated, the circuit for comparing absolute values of differences according to the present invention performs, in response to coincidence/incoincidence of signs of respective outputs from first and second subtracters, either subtraction of the output of the first subtracter from that of the second subtracter or addition of the respective outputs from the first and second subtracters to select either the sign of the result of the above subtraction or addition or an inverted sign thereof in response to the sign of the output from the second subtracter.

In more concrete terms, in the inventive circuit for comparing absolute values of differences, all of incrementers, one n-bit multiplexer and one inverter are removed from the conventional construction in FIG. 1 and the remaining multiplexer is modified to an (n+1)-bit multiplexer if required. The inventive circuit for comparing absolute values of differences includes an adder for adding up the output from a first selecting circuit formed by the multiplexer and an inverter and output from a subtracter in a path provided with no such selector, and a second selector for passing through or inverting the most significant bit carry output of the adder to supply the same and a control circuit for controlling, in response to a determination as to whether the carry outputs from the first and second subtracters have the same signs or different signs, the first selector to outputs either inverted or passed-through signal as well as outputting the value of "1" or "0" to the least significant bit carry input terminal of the adder to make the second selector output either inverted or passed-through signal in response to a determination as to whether the carry output from the most significant bit stage in the second subtracter is positive or negative.

According to the present invention, coincidence/incoincidence of the signs of the respective outputs from the first and second subtracters are simultaneously decided to select operation on the sum of or difference between the outputs from the subtracters in response to the result of decision, and hence no incrementer is required to invert the signs of the respective outputs from the respective subtracters requiring only one n-bit or (n+1)-bit multiplexer, thereby reducing circuitry scale.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
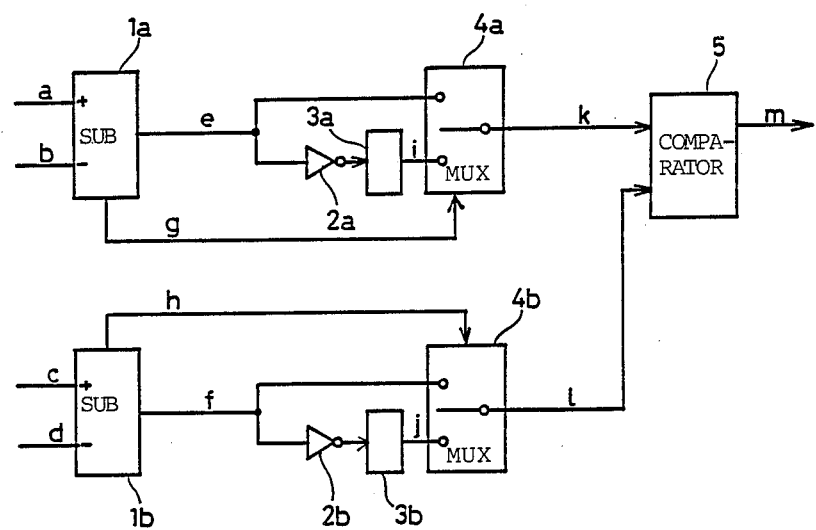
FIG. 1 is a block diagram showing the construction of a conventional circuit for comparing absolute values of differences.
Figure 2:
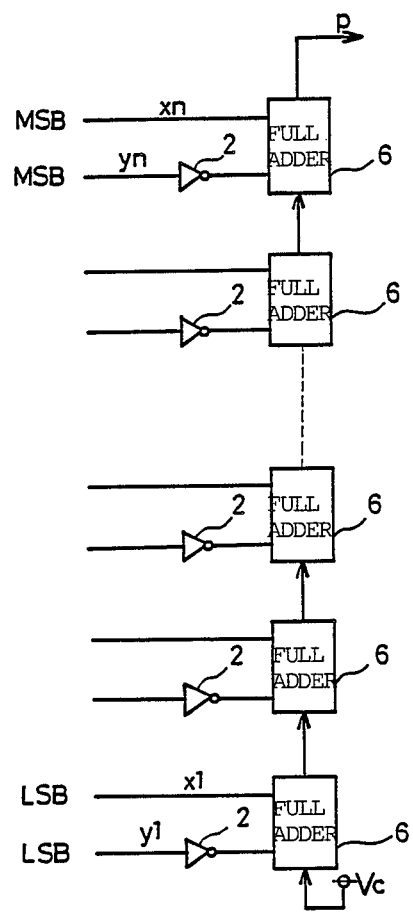
FIG. 2 illustrates an exemplary construction of a comparator used in the circuit as shown in FIG. 1.
Figure 3:
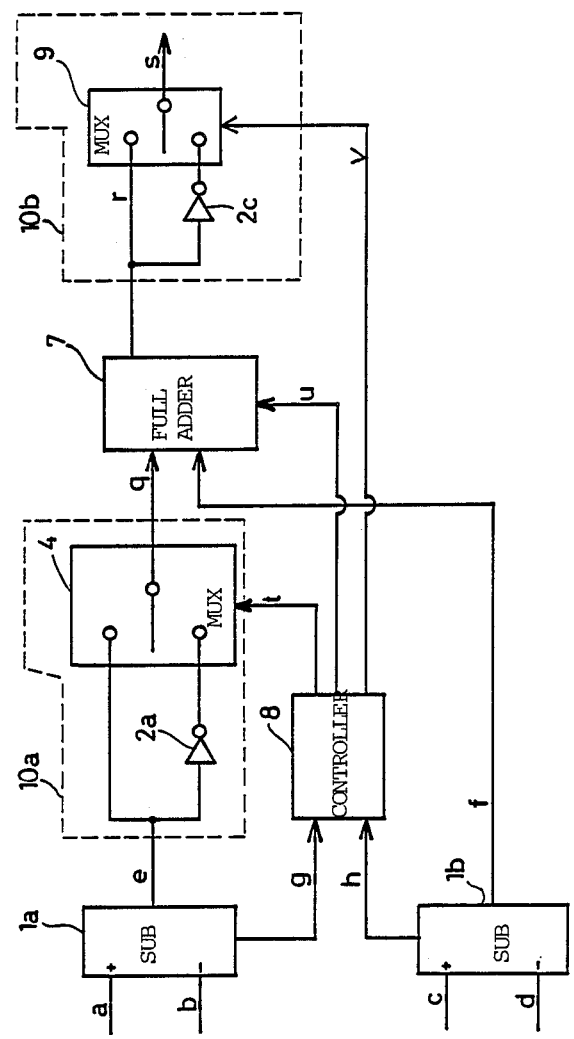
FIG. 3 is a block diagram showing the construction of a circuit for comparing absolute values of differences according to an embodiment of the present invention.

FIG. 3 shows the construction of a circuit for comparing absolute values of differences according to an embodiment of the present invention.

Referring to FIG. 3, the inventive circuit for comparing absolute values of differences comprises:

a first subtracter 1a which receives n-bit binary-coded digital values a and b and obtains the difference therebetween to supply the result e of subtraction in the form of (n+1)-bit offset binary-coded digital value to one input terminal of a multiplexer 4 and to a first inverter 2a while supplying a carry output (i.e., sign bit) g from an n-th-bit stage indicating whether the result of subtraction is positive or negative, a second subtracter 1b which receives n-bit binary-coded digital values c and d and obtains the difference therebetween to supply the result f of subtraction in the form of (n+1)-bit offset binary-coded digital value to the other input terminal of a full adder 7 while supplying a carry output (i.e., sign bit) from an n-th-bit stage for indicating whether the result f of subtraction is positive or negative to the other input terminal of a controller 8, an (n+1)-bit multiplexer 4 which receives the result e of subtraction of (n+1)-bit digital data from the first subtractor 1a in its one input terminal as well as receiving (n+1)-bit digital data obtained by inverting all bits of the result e of subtraction in its other input terminal through a first inverter 2a and selectively passes either the former or the latter in response to a first control signal t from the controller 8 to supply the same to one input terminal of the full adder 7, the full adder 7 which receives digital data g from the multiplexer 4 at its one input terminal while receiving digital data f from the second subtractor 1b at its other input terminal as well as a second control signal u from the controller 8 at its LSB carry input terminal and performs equivalently subtraction (e−f) or (f−e) to output a carry output r (sign bit) of the (n+1)-th-bit stage, a one-bit multiplexer 9 which receives the MSB carry output r from the full adder 7 at its one input terminal as well as an inverted carry output at its other input terminal through a second inverter 2c and selectively passes either the former or the latter in response to a third control signal v from the controller 8 to deliver a comparison result signal s, and the controller 8 which receives the MSB carry output g (sign bit) from the first subtracter 1a and an MSB carry output h (sign bit) from the second subtracter 1b for generating the first control signal t to supply the first control signal t to a control input terminal of the (n+1)-bit multiplexer 4 and generating the second control signal u of "1" or "0" to supply the same to the LSB carry output terminal of the full adder 7 while generating the third control signal v to supply the same to the control input terminal of the one-bit multiplexer 9, in response to the signs indicated by the MSB carry outputs g, h.

The first inverter 2a and the multiplexer 4 construct a first selecting block. The second inverter 2c and the multiplexer 9 construct a second selecting block.

The first control signal t makes the multiplexer 4 select the bit-inverted value of the result e of subtraction when the sign bits g and h have the same signs (same values) while selecting the result e of subtraction when the sign bits g and h have different signs (different values).

The second control signal u becomes "1" when the sign bits g and h have the same signs (same values) and becomes "0" when the sign bits g and h have different signs (different values).

The third control signal v makes the multiplexer 9 select the output r from the full adder 7 when the MSB carry output h (sign bit) from the second subtractor 1b is negative (h=0) while selecting an inverted signal of the output r from the full adder 7 when the sign bit h is positive (h=1). Description is now made on the operation of the circuit as shown in FIG. 3.

The first subtracter 1a receives the n-bit binary-coded digital values a and b and performs subtraction of (a−b) to supply the (n+1)-bit offset binary-coded digital value e as the result of subtraction to one input terminal of the multiplexer 4 and to the first inverter 2a while supplying the MSB carry output g (sign bit) indicating the sign of the result e of subtraction to one input terminal of the controller 8.

The second subtracter 1b receives the n-bit binary-coded digital values c and d and performs subtraction of (c−d) to supply the (n+1)-bit offset binary-coded digital value f as the result of subtraction to the other input terminal of the full adder 7 while supplying the MSB carry output h indicating the sign of the result f of subtraction to the other input terminal of the controller 8.

The MSB carry output g becomes "1" when the result e of subtraction is positive and becomes "0" when the result e of subtraction is negative.

Similarly, the MSB carry output h becomes "1" when the result f of subtraction is positive and becomes "0" when the result f of subtraction is negative.

The controller 8 supplies the first control signal t to the control input terminal of the multiplexer 4 in response to coincidence/incoincidence of the signs of the carry outputs g and h.

In response to a sign coincidence detecting signal from the controller 8, the multiplexer 4 in the first selecting block 10a selects the bit-inverted digital value of the result e of subtraction to supply the same to one input terminal of the full adder 7. To the contrary, the multiplexer 4 in the first selecting block 10a selects the result e of subtraction in response to a sign incoincidence detecting signal from the controller 8 to supply the same to one input terminal of the full adder 7.

The controller 8 supplies "1" to the LSB carry input terminal of the full adder 7 when the signs indicated by the carry outputs g and h are coincident. To the contrary, the controller 8 supplies "0" to the LSB carry input terminal when the signs indicated by the carry outputs g and h are coincident.

Therefore, the full adder 7 operates (−e+f) when the sign bits g and h are coincident while operating (e+f) when the same are incoincident.

In other words, depending on the positive-negative combination of the results e and f of subtraction, the full adder 7 performs operation on one of the following expressions:

(i) if e>0 and f>0, then $$-e+f=-|e|+|f|$$

(ii) if e<0 and f<0, then $$-e+f=|e|-|f|$$

(iii) if e>0 and f<0, then $$e+f=|e|-|f|$$

(iv) if e<0 and f>0, then $$e+f=-|e|+|f|.$$

The full adder 7 performs the calculation of one of the above expressions (i) to (iv) to supply only the carry output of the (n+1)-th-bit stage as the output r to one input terminal of the one-bit multiplexer 9 and to the second inverter 2c in the second selecting block 10b. The carry output r from the full adder 7 is a sign bit indicating the sign of either offset binary-coded digital value $|e|-|f|$ or $|f|-|e|$. Therefore, it becomes "1" when the result of calculation in the full adder 7 is positive and becomes "0" when the same is negative.

The controller 8 further supplies the third control signal v to the control terminal of the one-bit multiplexer 9 in the second selecting block 10b in response to the sign (i.e., sign bit h) of the result f of subtraction in the second subtracter 1b.

In response to the third control signal v, the multiplexer 9 selects the inverted signal of the sign bit r from the inverter 2C when the result f of subtraction is positive and selects the sign bit r from the full adder 7 when the result f of subtraction is negative.

As obvious from transformation of the expressions (i) to (iv), the full adder 7 performs the following calculation:

(v) if f>0, then $$|f|-|e|; \text{ or}$$

(vi) if f<0, then to derive the carry output r of the (n+1)-th-bit stage indicating the sign of the result of calculation. Thus, an output s from the one-bit multiplexer 9 is a sign bit indicating the sign of the offset binary-coded digital value ($|e|-|f|$).

Since $e=(a-b)$ and $f=(c-d)$, the output s from the multiplexer 9 is the sign bit of:

$$|e|-|f|=|a-b|-|c-d|$$

in offset binary-coded representation, and the following relation is satisfied;

if $|a-b| \geq |c-d|$, then s=1;

if $|a-b| < |c-d|$, then s=0

Thus, the output s from the one-bit multiplexer 9 represents the result of comparison of the absolute value of the difference between a and b and that of the difference between c and d.

Although the n-bit binary-coded digital values are applied to the subtracters in the aforementioned embodiment, n-bit offset binary-coded digital values may be applied to the subtractors to obtain a similar effect.

Also in case where 2's complement coded binary digital values are applied to the subtractors, absolute values of differences can essentially be compared by a construction similar to that shown in FIG. 3. In this case, however, required are the following modifications:

The multiplexer 4 is modified to an n-bit multiplexer and the full adder 7 is modified to an n-bit full adder having only a carry output and no sum output.

In this case, the results e and f of subtraction are digital values respectively of (a−b) and (c−d) represented in 2's complement code.

The sign bits g and h indicating the respective signs of the results e and f of subtraction in the subtracters 1a and 1b are supplied as the carry outputs in the most significant bits of the subtracters 1a and 1b respectively, to become "0" when the result e(f) of subtraction is positive and become "1" when the same is negative.

The full adder 7 outputs only the carry r of the n-th-bit (MSB) stage as the carry output. The carry output r is a sign bit in 2's complement coded representation of ($|e|-|f|$) or ($|f|-|e|$), which becomes "0" when the result of subtraction is positive and becomes "1" when the same is negative.

The one-bit multiplexer 9 outputs the sign bit in 2's complement representation of ($|e|-|f|$) as the output s. Namely, if $|a-b| \geq |c-d|$, then s=0; and if $|a-b| < |c-d|$, then s=1.

Thus, the output s from the multiplexer 9 supplies the result of comparison of the absolute value of the difference between a and b and that of the difference between c and d.

According to the circuit for comparing absolute values of differences as hereinabove described, operation on the sum of or difference between the outputs from the first and second subtracters is performed in response to coincidence/incoincidence of the signs of the results of subtraction in the subtracters to select the sign of the result of operation on the sum or difference in response to the sign of the output from the second subtractor, and hence all of the incrementers for inverting the signs of the outputs from the subtractors can be removed with provision of only one n-bit or (n+1)-bit multiplexer, whereby the circuit can extremely be reduced in scale in comparison with the conventional circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An absolute value comparator for performing comparison of the absolute value of difference between first and second n-bit digital values and that of difference between third and fourth n-bit digital values, said comparator comprising:

a first substractor for performing subtraction of said first and second digital values thereby to supply the result of subtraction and a first sign indicating signal indicating the sign of the result of subtraction;

a second subtractor for performing subtraction of said third and fourth digital values to supply the result of subtraction and a second sign indicating signal indicating the sign of the result of subtraction;

controller means for receiving said first sign indicating signal from said first subtractor and said second sign indicating signal from said second subtractor to decide the coincidence or incoincidence of the signs indicated by the same thereby to output sign identifying signals, said sign identifying signals indicating the result of decision;

said absolute value comparator further comprising:

operating means for performing, in response to said sign identifying signals, operation on either subtraction of said result of subtraction in said first subtractor and said result of subtraction in said second subtractor or addition of said result of subtraction in said first subtractor and said result of subtraction in said second subtractor to output a third sign indicating signal indicating the sign of the result of operation on either the subtraction or addition;

controller means for receiving said second sign indicating signal from said second subtractor to detect the sign indicated by said second sign indicating signal thereby to output a fourth sign indicating signal; and selecting means for receiving said third sign indicating signal from said operating means to selectively pass either said third sign indicating signal or an inverted signal of said third sign indicating signal in response to said fourth sign indicating signal from said sign detecting means.

2. An absolute value comparator for differences in accordance with claim 1, wherein said operating means perform subtraction of said result of subtraction in said first subtractor from said result of subtraction in said second subtractor in response to a sign coincidence detecting signal from said controller means; and said operating means further performing addition of said result of subtraction in said first substractor and said result of subtraction in said second substractor in response to a sign incoincidence detecting signal from said controller means.

3. An absolute value comparator for differences in accordance with claim 2, wherein said selecting means passes said output from said operating means when said fourth sign indicating signal indicates negative; and said selecting means further passing said inverted signal of said output from said operating means when said fourth sign indicating signal indicates positive.

4. An absolute value comparator for differences in accordance with claim 1, wherein said sign indicating signals from said controller means includes a first sign identifying signal and a second sign identifying signal of a binary level;

said operating means comprising:

second selecting means for receiving said result of subtraction in said first subtractor to selectively pass either said result of subtraction or a bit-inverted value obtained by inverting all bits of said result of subtraction in response to said first sign identifying signal;

said operating means further comprising:

full adder means for receiving both a digital value signal from said second selecting means and said result of subtraction in said second subtractor and said second sign identifying signal in the carry input terminal of the least significant bit stage thereof;

said full adder means performing addition of said digital value signal from said second selecting means and said result of subtraction in said second subtractor; and said full adder means outputting a carry of the most significant bit stage thereof.

5. An absolute value comparator for differences in accordance with claim 1, wherein said first to fourth n-bit digital values are binary-coded digital values, said results of subtraction in said first and second subtractors being (n+1)-bit digital values including carries at the most significant bit stages.

6. An absolute value comparator for differences in accordance with claim 1, wherein said first to fourth n-bit digital values are offset binary-coded digital values, said results of subtraction in said first and second subtractors being (n+1)-bit digital values including carries at the most significant bit stages.

7. An absolute value comparator for differences in accordance with claim 1, wherein said first to fourth n-bit digital values are two's complement coded digital values, said results of subtraction in said first and second subtractors being n-bit digital values.

* * * * *